United States Patent
Satoh et al.

[11] Patent Number: 5,287,793
[45] Date of Patent: Feb. 22, 1994

[54] POWER PISTON ASSEMBLY FOR BOOSTER WITH DIAPHRAGM RETAINER

[75] Inventors: Tohru Satoh; Atushi Satoh, both of Saitama, Japan

[73] Assignee: Jidosha Kiki Co., Ltd., Tokyo, Japan

[21] Appl. No.: 18,743

[22] Filed: Feb. 17, 1993

[30] Foreign Application Priority Data

Apr. 9, 1992 [JP] Japan .................................. 4-117002

[51] Int. Cl.⁵ .......................... F15B 9/10; F01B 19/00; F16J 3/00
[52] U.S. Cl. ................................... 91/376 R; 92/98 R
[58] Field of Search ............... 91/369.1, 369.2, 376 R; 92/48, 98 R

[56] References Cited

U.S. PATENT DOCUMENTS

| | | | |
|---|---|---|---|
| 4,787,292 | 11/1988 | Tsuyuki et al. | 92/48 X |
| 5,046,398 | 9/1991 | Hamamiya et al. | 91/369.2 |
| 5,083,495 | 1/1992 | Satoh | 92/48 X |
| 5,121,673 | 6/1992 | Araki | 91/369.1 |
| 5,170,628 | 12/1992 | Satoh et al. | 91/369.1 X |
| 5,178,055 | 1/1993 | Shinohara et al. | 91/369.1 X |

FOREIGN PATENT DOCUMENTS 64-9871 1/1989 Japan .

Primary Examiner—Edward K. Look
Assistant Examiner—John Ryznic
Attorney, Agent, or Firm—Flynn, Thiel, Boutell, & Tanis

[57] ABSTRACT

A power piston assembly for booster, in particular, an improvement of an axial portion of a power piston and a retainer which is engaged therewith is disclosed. A front power piston is formed with a first and a second tubular section around its inner periphery, and the first tubular section is fitted around a flange of a valve body and is prevented from disengagement therefrom by an annular retainer. Around its outer peripheral edge, the retainer is formed with a peripheral tubular portion, which is disposed as a press fit around the second tubular section of the front power piston from the front side, thereby connecting the front power piston to the flange of the valve body. With this arrangement, the front end of the first tubular section of the front power piston may be located rearward of the front end of the valve body (or its flange). Accordingly, the axial size of the first tubular section and hence of the booster may be reduced as compared with a conventional arrangement.

6 Claims, 3 Drawing Sheets

POWER PISTON ASSEMBLY FOR BOOSTER WITH DIAPHRAGM RETAINER

FIELD OF THE INVENTION

The invention relates to a power piston assembly for rooster, and more particularly, to an improvement of an axial portion of a power piston and a retainer engaging it.

DESCRIPTION OF THE PRIOR ART

A booster is known in the art comprising a valve body having a flange formed around the periphery thereof at its front end and which bulges radially outward, a power piston having a tubular section formed in its axial portion which is fitted over the flange of the valve body from the rear side thereof and also having a positioning portion formed at the rear end of the tubular section and which is disposed in abutment against the rear end face of the flange, and an annular retainer which prevents the disengagement of the tubular section of the power piston from the flange (see, for example, Japanese Laid-Open Utility Model Application No. 9,871/1989).

In a booster of this disclosure, the tubular section of the power piston projects forwardly beyond the front end face of the flange of the valve body so that a disc-shaped retainer may be placed over the projecting tubular section as a press fit from the front side. However, this booster suffers from an increased axial size as a result of the increased axial length of the tubular section which results from the tubular section of the power piston projecting forwardly beyond the front end face of the flange.

SUMMARY OF THE INVENTION

In view of the foregoing, the invention provides an improvement of a booster comprising a valve body having a flange formed around the outer periphery at its front end and which bulges radially outward, a power piston having a tubular section formed at its axial portion which is fitted around the flange of the valve body from the rear side and also having a positioning portion formed at the rear end of the tubular section which is disposed in abutment against the rear end face of the flange, and an annular retainer which prevents the disengagement of the tubular section of the power piston from the flange. In accordance with the invention, a front end of the tubular section is folded upon itself to extend rearwardly to define a second tubular section at a position outward of the first mentioned tubular section, and the retainer which is disposed in abutment against the front end face of the valve body has its outer peripheral edge extended rearwardly to form a peripheral tubular portion, which is fitted over the second tubular section of the power piston from the front side while simultaneously engaging a plurality of engaging pawls formed around the inner peripheral surface of the peripheral tubular portion with the outer peripheral surface of the second tubular section.

With this arrangement, it is unnecessary to extend the front end of the tubular section to a point forward of the front end face of the flange, whereby the axial size of the tubular section may be reduced by a corresponding amount as compared with the prior art. In this manner, the axial size of the resulting booster can be reduced.

Above and other objects, features and advantages of the invention will become apparent from the following description of several embodiments thereof with reference to the drawings.

DETAILED DESCRIPTION OF EMBODIMENTS

Figure 1:
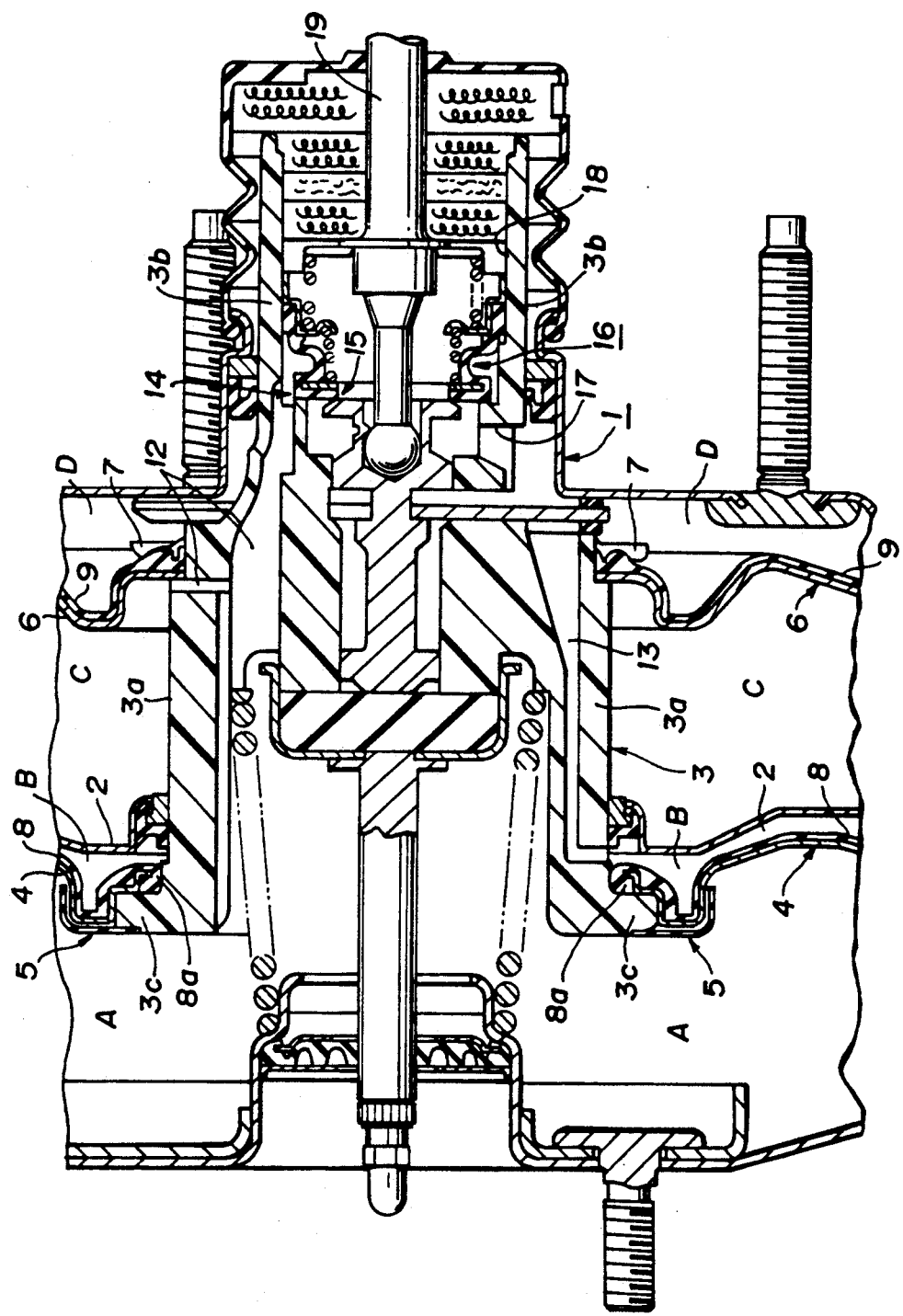
FIG. 1 is a schematic view, essentially a longitudinal section, of a booster according to a first embodiment of the invention.

Several embodiments of the invention will now be described with reference to the drawings. FIG. 1 shows the internal construction of a brake booster of tandem type including a shell 1, the interior of which is divided by a center plate 2 into a pair of forward and rearward spaces. A substantially cylindrical valve body 3 slidably extends through an axial portion of the center plate 2.

The valve body 3 includes portions of an increased diameter $3a$ and a reduced diameter $3b$, respectively, and also includes a flange $3c$ which bulges radially outward and formed around the periphery of the portion $3a$ of an increased diameter at its front end, which represents the foremost end of the entire valve body 3. An axial portion of a front power piston 4 is mounted on the flange $3c$ and is locked against withdrawal by an annular retainer 5. An axial portion of a rear power piston 6 is connected around the periphery of the portion $3a$ of an increased diameter at its rear end, and is also locked against withdrawal by a retainer 7.

A front and a rear diaphragm 8, 9 are applied to the back surfaces of the power pistons 4, 6 to define a constant pressure chamber A and a variable pressure chamber B across the front diaphragm 8 and also define a constant pressure chamber C and a variable pressure chamber D across the rear diaphragm 9.

The both constant pressure chambers A, C communicate with each other through a constant pressure passage 12 formed in the valve body 3, and also communicate with a source of negative pressure through a tubing, not shown, which is connected to the front wall of the shell 1 for introducing a negative pressure. In this manner, a negative pressure is normally maintained in the both constant pressure chambers A, C. The both variable pressure chambers B, D communicate with each other through a variable pressure passage 13 also formed in the valve body 3.

A vacuum valve 14 and an atmosphere valve 15 form together a valve mechanism 16, which is well known in itself and which is disposed within the valve body 3. A space external of the vacuum valve 14 communicates with the both constant pressure chambers A, C through the constant pressure passage 12, while a space located between the atmosphere valve 15 and the vacuum valve 14 communicates with the rear variable pressure chamber D through a radially extending variable pressure passage 17 which is formed in the valve body 3. Finally, a space internal of the atmosphere valve 15 communicates with the atmosphere through a pressure passage 18 also formed in the valve body 3. The valve mechanism 16 is operated as an input shaft 19 is driven back and forth, thereby allowing the communication between the both constant pressure chambers A, C and the both variable pressure chambers B, D to be switched. The described arrangement and the operation thereof remain the same as those of a conventional brake booster of tandem type which is known in the art.

Figure 2:
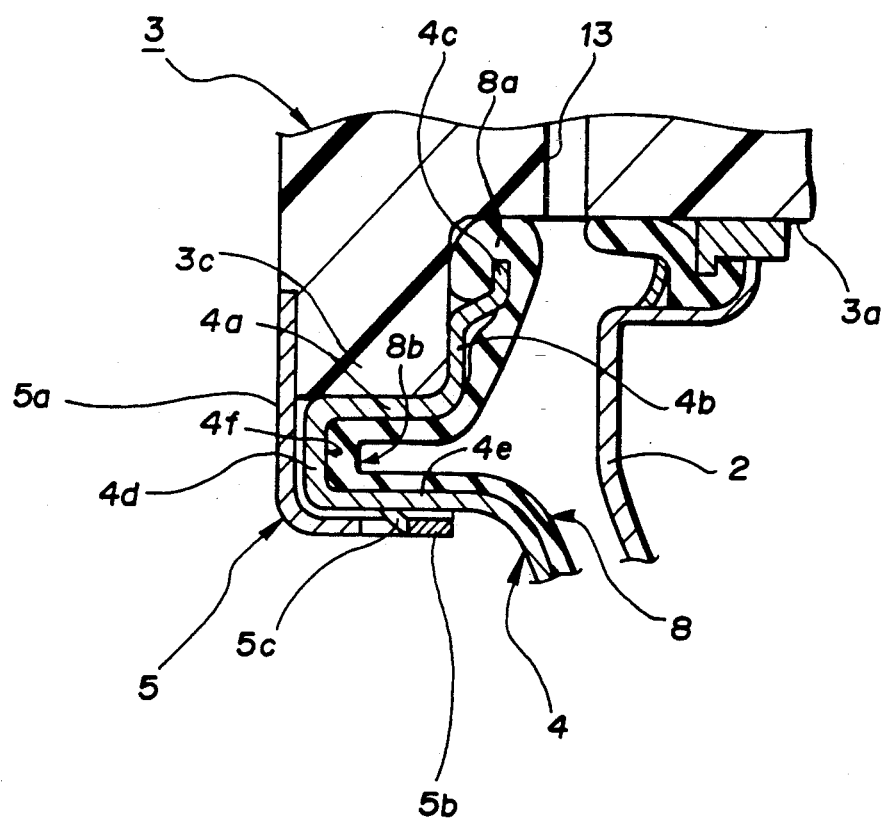
FIG. 2 is an enlarged view of an essential part shown in FIG. 1.

As shown to an enlarged scale in FIG. 2, in the present embodiment, the front power piston 4 includes an axial portion comprising a first tubular section 4a which is fitted around the flange 3c of the valve body 3, and a positioning section 4b which extends radially inward by being bent from the rear end of the first tubular section 4a. The inner periphery of the positioning section 4b or the inner periphery of the front power piston 4 defines a connection 4c extending rearwardly in the form of a hook. The front diaphragm 8 includes a bead 8a extending around its inner periphery, which is connected to the connection 4c by covering it from the radial inside thereof.

The front end of the first tubular section 4a is extended radially outward to form a radial section 4d, the outer periphery of which is folded back rearwardly to form a second tubular section 4e. The combination of the first tubular section 4a, the radial section 4d and the second tubular section 4e defines a channel-shaped annular groove 4f extending around the inner periphery of the front power piston and which extend toward the front side thereof.

On the other hand, adjacent to its inner periphery, the front diaphragm 8 is formed with a channel-shaped annular bulge 8b which extends forwardly, at a location radially outward of the bead 8a. The annular bulge 8b is formed so as to conform to the size of the annular groove 4f in the front power piston 4 so that it may be fitted therein from the rear side during the assembly of the brake booster.

With its connection 4c fitted in the bead 8a of the front diaphragm 8, the axial portion of the front power piston 4 is fitted over the portion 3a of an increased diameter of the valve body 3 from the rear side, with its first tubular section 4a fitted around the flange 3c and its positioning section 4b disposed in abutment against the rear end face of the flange 3c. When so disposed, the bead 8a extending around the inner periphery of the front diaphragm 8 which is connected with the connection 4c is held in close adherence to the rear end face of the flange 3c and the outer peripheral surface of the portion 3a of an increased diameter of the valve body. Under this condition, the radial section 4d is located slightly rearward of the front end face of the flange 3c.

Under this condition, a retainer 5 is engaged with the second tubular section 4e, thus preventing the first tubular section 4a of the front power piston 4 from being disengaged from the flange 3c of the valve body 3. In the present embodiment, the retainer 5 is formed of a plate-like metal member including a radially extending portion 5a, the outer peripheral edge of which is extended axially rearward to form a peripheral tubular portion 5b, in which a plurality of engaging pawls 5c are formed at an equal interval around the circumference so that they project inward from the peripheral tubular portion 5b. The peripheral tubular portion 5b of the retainer 5 is fitted over the second tubular section 4e of the front power piston 4 from the front side, and then the radial portion 5a of the retainer 5 is disposed in abutment against the front end face of the flange 3c.

The engagement of the engaging pawls 5c extending from the peripheral tubular portion 5b of the retainer 5 with the second tubular section 4e of the front power piston 4 under its own resilience assures a positive mounting of the first tubular section 4a and the positioning section 4b of the front power piston as well as the bead 8a extending around the inner periphery of the front diaphragm 8 upon the flange 3c in the manner mentioned above.

With this embodiment, the axial size of the first tubular section 4a can be reduced as compared with a conventional arrangement, thus resulting in a reduced axial size of a resulting brake booster.

By contrast, in the prior art practice, the front end of the first tubular section 4a projects forwardly beyond the front end face of the flange 3c or the valve body 3 so that a retainer 5 in the form of a disc may be disposed as a press fit into the projecting tubular section 4a from the front side. Accordingly, in such a conventional arrangement, the axial size of the brake booster must be increased by an amount by which the first tubular section 4a must project forwardly beyond the front end face of the flange 3c.

However, in accordance with the present embodiment, there is no need to cause the front end of the first tubular section 4a to project forwardly beyond the front end face of the flange 3c, thus allowing the axial size of a resulting brake booster to be reduced by a corresponding amount as compared with the conventional arrangement. In addition, the close adherence of the bead 8a extending around the inner periphery of the front diaphragm 8 against the rear end face of the flange 3c and the outer peripheral surface of the portion 3a of an increased diameter achieves a more reliable hermetic seal in such region.

SECOND EMBODIMENT

Figure 4:
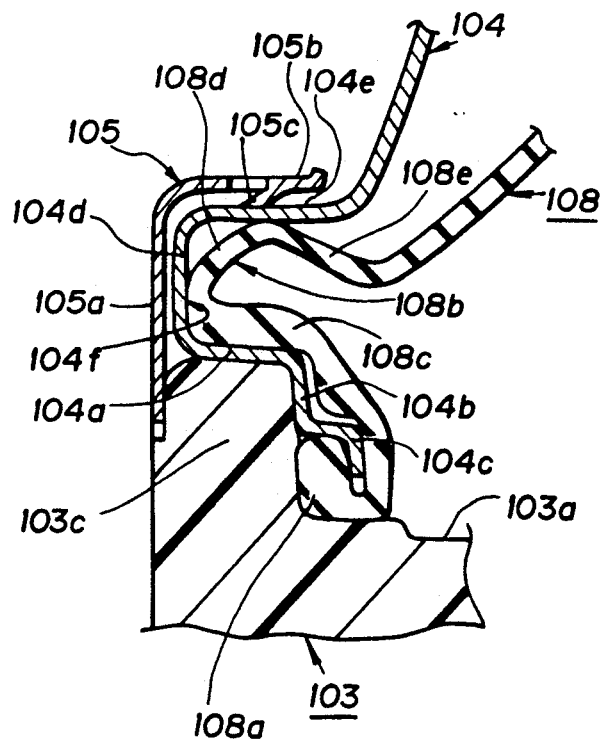
FIG. 4 is an enlarged cross section illustrating the assembly of a second embodiment of the invention.

FIG. 4 shows a second embodiment of the invention. In the second embodiment, a front diaphragm 108 includes an annular bulge 108b in which a portion extending from an inner tubular portion 108c to a bead 108a extending around the inner periphery of the front diaphragm has a wall thickness which is chosen to be approximately twice the wall thickness of its remainder which is located radially outward of the tubular portion 108c. It is to be understood that parts shown in this Figure are designated by like reference numerals as used before, to which 100 is added. The use of the front diaphragm 108 of the second embodiment facilitates the assembly of the brake booster.

Specifically, during the assembly of the brake booster, the bead 108a extending around the inner periphery of the front diaphragm 108 is connected to the connection 104c of a front power piston 104, as shown in FIG. 4, and then a first tubular section 104a of the front power piston 104 is fitted around a flange 103c, and the bead 108a is disposed as a press fit around a portion 103a of an increased diameter of a valve body 103.

A retainer 105 is fitted, from the front side, over a second tubular section 104e of the front power piston 104 which assumes such condition, and at the same time the inner tubular portion 108c of the annular bulge 108b of the front diaphragm is fitted, from the rear side, over the first tubular section 104a of the front power piston 104 within an annular groove 104f. As mentioned previously, the tubular section 108c has an increased wall thickness which presents an increased resistance to a twisting of itself, whereby the tubular section 108c can be fitted over the first tubular section 104a of the front power piston 104 in a very smooth manner. As the tubular portion 108c of an increased wall thickness is fitted over the first tubular section 104a, a radial section 108d and an outer tubular portion 108e, both of which have a reduced wall thickness, can be smoothly mounted in the annular groove 104f. This completes the assembly of the booster, as shown in FIG. 1.

Upon completion of the assembly, if a load is applied which tends to cause the entire front diaphragm 108 to be displaced toward the rear side, the tubular portion 108c of the front diaphragm 108 has a high rigidity due to its increased wall thickness, which is effective to prevent the annular bulge 108b of the front diaphragm 108 from being disengaged from the annular groove 104f in the front power piston 104.

Figure 3:
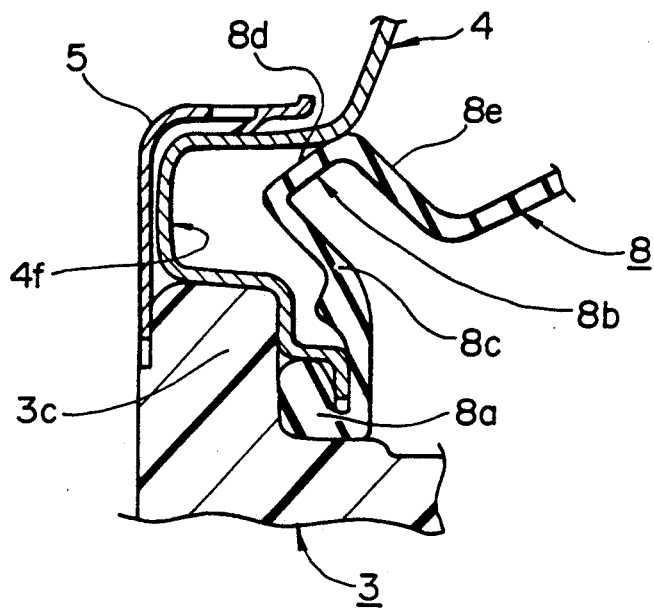
FIG. 3 is an enlarged view illustrating the assembly of the part shown in FIG. 1.

In contrast to the arrangement of the second embodiment described above, with the front diaphragm 8 of the first embodiment mentioned above, it will be noted from FIG. 3 that an inner tubular portion 8c and a radially outward portion which continues therefrom, constituting together the annular bulge 8b, has substantially an equal wall thickness, which is relatively small. Accordingly, the rigidity of the annular bulge 8b is insufficient to prevent a twisting of the annular bulge 8b during the assembly of the brake booster. As a consequence, when mounting the annular bulge 8b in the annular groove 4f of the front power piston, there is experienced a disadvantageous difficulty in mounting the annular bulge 8b because of the abutment of a radial section 8d thereof against the inlet portion of the annular groove 4f in the front power piston 4. In addition, after the completion of the assembly, if any load is applied which tends to urge the front diaphragm 8 rearwardly, the insufficient rigidity of the annular bulge 8b disavantageously allowed a disengagement of the annular bulge 8b from within the annular groove 4f in the front power piston 4. Such disadvantages of the first embodiment can be eliminated with the arrangement of the second embodiment.

While the embodiments have been described above as applied to a brake booster of tandem type, it should be understood that the invention is equally applicable to a brake booster of a single type or a brake booster of triple type in which a shell 1 contains three pairs of constant and variable pressure chambers.

While the invention has been disclosed above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A power piston assembly for a brake booster including a valve body having a flange formed around the periphery at its front end and which bulges radially outward, a power piston including a tubular section formed in its axial portion which is fitted over the flange of the valve body from the rear side and also including a positioning section which is formed at the rear end of the tubular section and which is disposed in abutment against the rear end face of the flange, and an annular retainer for preventing the tubular section of the power piston from being disengaged from the flange; the power piston assembly being characterized in that the front end of the tubular section is folded upon itself to extend rearwardly to define a second tubular section at a location outward of the first mentioned tubular section, the retainer being disposed in abutment against the front end face of the valve body and including an outer peripheral edge which is extended rearwardly to define a peripheral tubular portion, which is fitted around the second tubular section of the power piston from the front side, the peripheral tubular portion being formed with a plurality of engaging pawls projecting inwardly therefrom and engaging the outer peripheral surface of the second tubular section.

2. A power piston assembly according to claim 1 in which a diaphragm formed of an elastic material is applied to the back surface of the power piston.

3. A power piston assembly according to claim 2 in which the first mentioned tubular section and the second tubular section of the power piston are connected together by a radial section, and these sections constitute together an annular groove around the inner periphery of the power piston which extends in the forward direction, the diaphragm being formed with an annular bulge around its inner periphery which is fitted into the annular groove in the power piston from the rear side.

4. A power piston assembly according to claim 3 in which a tubular portion located inward of the annular bulge of the diaphragm has a wall thickness, which is greater than the wall thickness of a portion located outward of the annular bulge.

5. A power piston assembly according to claim 3 in which a tubular portion located inward of the annular bulge of the diaphragm has a wall thickness, which is chosen to be approximately twice the wall thickness of a portion located outward of the annular bulge.

6. A power piston assembly according to claim 1 in which the booster comprises a brake booster of tandem type.

* * * * *